Patented Jan. 26, 1954

2,667,450

UNITED STATES PATENT OFFICE 2,667,450

SEPARATION OF ALDEHYDES FROM ALIPHATIC HYDROCARBONS BY AZEOTROPIC DISTILLATION WITH PERFLUOROCOMPOUNDS

Martin R. Cines, Knoxville, Tenn., assignor to Phillips Petroleum Company, a corporation of Delaware No Drawing. Application August 14, 1951, Serial No. 241,899

3 Claims. (Cl. 202—42)

This invention relates to a new process for the separation of solutions of liquid mixtures of aldehydes from aliphatic hydrocarbons having vapor pressures which are substantially the same, or which form azeotropic mixtures, and the complete separation of which by ordinary fractionation methods is, for these reasons, extremely difficult and often impossible. In one of its aspects the invention relates to the employment of an entrainer whereby the desired separation can be accomplished.

I have now found a new method or manner for removing or separating aldehydes from aliphatic hydrocarbons. This new method removes the aldehydes by means of azeotropic distillation in the presence of an entrainer selected from the group of non-acidic organic perfluoro-compounds. The aldehydes are removed as overhead and the aliphatic hydrocarbons removed as a kettle product. Ordinary azeotropic distillation equipment can be used in effecting this process.

Entrainers according to this invention are non-acidic organic perfluoro-compounds such as perfluoro-n-heptane and perfluoro-methylcyclohexane, and other compounds such as perfluoro-di-n-butyl ether, perfluoro-tri-n-propylamine and perfluoro-tri-n-butylamine. Other compounds within the defined group are satisfactory. It is desirable to employ an entrainer having a boiling point within 70° F., preferably 35° F., of the aldehyde. Entrainers having boiling points over 75° F. from that of the aldehyde to be removed are less effective and sometimes completely ineffective. It is preferable that when aliphatic hydrocarbon mixtures are to be processed by this invention for the removal of aldehydes, that the boiling range of the hydrocarbon cut should not be over 50° F. and is more preferably not over 25° F.

The operation of this process is quite similar to the usual azeotropic distillation process in that the entrainer and the hydrocarbon mixture to be purified are charged to a fractionating column; the aldehyde azeotrope is removed overhead and the purified hydrocarbon is removed as a kettle product. The entrainer is then recovered from the overhead product and recycled to the column for further use. No consumption of the entrainer other than normal handling losses is encountered.

Some ketones can likewise be removed from aliphatic hydrocarbons through the use of perfluoro compounds as entrainers.

The following two examples are illustrative of the effectiveness of this process. The tests were carried out in a small distillation column consisting of a two foot section of glass tubing approximately 6 mm. inside diameter and containing a single wire spiral for packing. The column was insulated by a vacuum jacket and equipped with a suitable kettle and a total condensing head with the liquid takeoff.

EXAMPLE I

*Azeotropic distillation data*

| System | Boiling point, °F. | Charge volume, percent | Overhead data | | |
|---|---|---|---|---|---|
| | | | Composition, volume Percent | Temp., °F. | Liquid phases |
| Isovaleraldehyde | 198.5 | 33.3 | 23.1 | 155 | 2 |
| 2-3 dimethylpentane | 193.5 | 33.3 | 6.9 | | |
| Perfluoro-n-heptane | 181.0 | 33.4 | 70.0 | | |

EXAMPLE II

| System | Boiling point, °F. | Charge volume, percent | Overhead data | | |
|---|---|---|---|---|---|
| | | | Composition, volume percent | Temp., °F. | Liquid phases |
| 1-pentanal | 215 (744 mm.) | 33.3 | 26.6 | [1] 177–183 | 2 |
| 2,2,4-trimethylpentane | 211 | 33.3 | 13.4 | | |
| Perfluorodimethylcyclohexane | 214 | 33.4 | 60.0 | | |

[1] A plateau was obtained from 178.7° to 179.0° F.

The above data were obtained at atmospheric pressure. In carrying out the test, the kettle was charged with the hydrocarbon and the aldehyde along with a small amount of the entrainer. The column was then started in operation and when equilibrium was reached, an overhead sample was taken. The overhead product from each of these two tests was homogeneous at the boiling point, but it was a two phase mixture at room temperature.

The effectiveness of this class of entrainers is quite evident from the foregoing tests. Even though the aldehyde and the aliphatic hydrocarbons were close boiling, the very low efficiency column (about five theoretical plates or less) effected quite substantial concentration of the aldehyde in the overhead product based on the entrainer-free material.

Reasonable variation and some modification are possible within the scope of the foregoing disclosure and the appended claims to my contribution to the art the essence of which is that nonacidic organic perfluoro compounds have been found to be highly effective for the removal by distillation of aldehydes from mixtures of them with closely boiling aliphatic hydrocarbons.

I claim:

1. The separation of difficultly separable liquid mixtures of aliphatic aldehydes from aliphatic hydrocarbons, by using an entrainer selected from the group consisting of perfluoro-n-heptane and perfluoro-methylcyclohexane, perfluoro-di-n-butyl ether, perfluoro-tri-n-propylamine and perfluoro-tri-n-butylamine and subjecting said mixtures to distillation.

2. The separation by distillation of a mixture of an aliphatic aldehyde and an aliphatic hydrocarbon which are difficultly separable by distillation which comprises the steps of admixing with said mixture an entrainer selected from the group consisting of perfluoro-n-heptane, perfluoro-methylcyclohexane, perfluoro-di-n - butyl ether, perfluoro-tri-n-propylamine and perfluoro-tri-n-butylamine and subjecting the admixture thus obtained to distillation.

3. The separation of 1-pentanal and 2,2,4-trimethylpentane by admixing therewith perfluorodimethylcyclohexane and subjecting the admixture thus obtained to distillation.

MARTIN R. CINES.

References Cited in the file of this patent

UNITED STATES PATENTS

| Number | Name | Date |
|---|---|---|
| 2,050,235 | Othmer | Aug. 4, 1936 |
| 2,376,870 | Engel | May 23, 1945 |
| 2,442,589 | Evans et al. | June 1, 1948 |